Patented Apr. 3, 1934

1,953,201

UNITED STATES PATENT OFFICE 1,953,201

ALUMINUM HYDRATE OF LOW WATER CONTENT AND PROCESS OF PRODUCING THE SAME

Martin Tosterud, New Kensington, Pa., assignor to Aluminum Company of America, Pittsburgh, Pa., a corporation of Pennsylvania No Drawing. Application September 3, 1926, Serial No. 133,518

11 Claims. (Cl. 23—143)

This invention relates to aluminum hydrate, and its chief object is to provide a simple and practical process for producing a hydrate of low content of combined water, resembling in that respect the naturally occurring substance known as diaspore. Another object is to produce a finely divided hydrate which is virtually if not actually amorphous, having the smooth feel of powdered talc and in some forms capable of "smearing" on a smooth surface, such as glass for example. To these and other ends the invention comprises the novel process and product hereinafter described.

In carrying out my invention in the preferred way I heat aluminum trihydrate in water, preferably but not necessarily containing a solvent of aluminum hydrate, as for example sodium or potassium hydroxid or carbonate, or mixtures thereof, in amount sufficient to dissolve only a portion of the hydrate, and I have found that by this simple procedure the combined water of the trihydrate can be reduced about one half, or say from about 35 per cent to less than 18 per cent or thereabouts. More specifically, heating in water at 170° C. for twenty-four hours, with frequent or continuous stirring, gave a product having a combined water content of 17.5 per cent. After ninety-six hours heating the water content was found to be 16.4 per cent, thus more closely approximating the theoretical content of aluminum "monohydrate", $Al_2O_3.H_2O$, which contains fifteen per cent of water, as distinguished from aluminum dihydrate, $Al_2O_3.2H_2O$. With the addition of 120 grams of sodium hydroxid per liter only one hour's heating at the temperature named sufficed to bring the water content of the hydrate down to less than 18 per cent. Sodium carbonate solutions are also effective but not so rapid in their action.

The process proceeds with satisfactory rapidity at temperatures as low as 150° C. and even lower. The preferred lower limit is about 120° C., and the upper limit is largely determined by the strength of the digester and the resistance of the material of which it is made to the action of the solvent employed. Under most conditions with sodium hydroxid solutions in steel apparatus the upper limit is around 200° C. Generally speaking, the stronger the treating solution and the higher the temperature the more rapid the conversion, and satisfactory results can be attained with a ten or twelve per cent solution of sodium hydroxid at temperatures close to boiling.

Aluminum trihydrate produced by the well known Bayer process as commonly practiced is distinctly granular in character, and "flows" like sand. When viewed under the microscope the grains appear as firm, solid aggregates of smaller crystals, apparently held together by cementing material. The low-water hydrate produced as described above is also more or less gritty. If this hydrate, produced by digestion in a solvent or in plain water, is again digested, this time in either an alkalin or an acid solvent solution, it undergoes a remarkable change. Separated from the liquor and dried, it is found to be in a state of extremely fine subdivision, substantially incapable of flowing, and feels like flour or more like powdered talc when rubbed between the fingers. It is so fine and has developed or acquired such marked adsorptive properties that it "smears" on glass and adheres tenaciously. Under the microscope some of the particles are found to be greatly reduced in size and others appear to be loosely held aggregates of minute crystals. Under the slightest pressure or rubbing these aggregates break down into particles which are comparable in size to the particles of sublimed zinc oxid. Apparently the change described is due to disintegration of the intergranular cement, referred to above, by the solvent action of the hydroxid or carbonate or other solvent used, leaving an impalpable powder. In producing this fine hydrate it is not necessary to remove the material from the first liquid (water or solvent solution) and place it in another, as I have found that the second treatment can be carried out, in effect, by prolonging the first after conversion is substantially complete, more of the solvent being added if necessary. The conversion to fine hydrate can be carried out at 100° C. or even lower but at such temperatures the action is slow, probably because of the lower solubility of the hydrate, and accordingly I prefer higher temperatures, say 120° C. and above. For simple conversion of trihydrate to hydrate of low water content, heating in water only is sufficient, and a weak alkali solution, for example as little as two grams of sodium hydroxid or carbonate per liter, is effective, but more rapid action is obtained with higher concentrations. For conversion to the fine state an appreciable solvent power is highly desirable if not absolutely necessary, and concentrations of 100 to 200 grams per liter are preferred for this stage, although smaller or larger amounts may be used.

Acid reagents can also be employed as solvents for producing the fine hydrate and in some cases may be preferred. Sulfuric acid is especially effective. Among other acids usable for the purpose are hydrochloric, hydrofluoric, and nitric.

Hydrate dissolved in the treatment or treatments may be recovered in any convenient way, as for example by precipitation with carbon dioxid. From an acid solution it may be recovered as the corresponding salt of high quality.

It has also been found that it is not necessary to add water to the trihydrate in order to convert it to the lower water form, but that conversion can be attained by heating the dry trihydrate alone in a closed container at temperatures such as described above. Apparently the solvent in that case is the water lost by the trihydrate during the heating.

The following are specific examples of carrying out my process in an effective manner.

A. Heat the trihydrate at about 170° C. in a solution containing about 120 grams of sodium hydroxid per liter, the solution being used in the proportion, roughly, of one liter per 300 grams of trihydrate. Satisfactory conversion is usually obtained in an hour. Then heat at about 170° C. in a solution containing about 160 grams of sodium hydroxid per liter, using one liter of the solution to 250 grams of the coarse hydrate, approximately, until the desired conversion to the fine state is attained.

B. Heat the coarse low-water hydrate produced according to the first step of the preceding example for about six hours in 15 per cent sulfuric acid at about 100° C., in the proportion of one liter of the weak acid to 100 grams of the coarse hydrate, more or less.

C. A satisfactory and economical method is to treat the trihydrate at 170° C. for one to three hours with a solution containing about 50 grams of sodium hydroxid per liter, using approximately one liter of solution to each 500 grams of solid. The resulting coarse product can be converted into the fine product by treating at 170° C. for about an hour, with stirring, in a solution containing, say, 160 grams of sodium hydroxid per liter, using one liter to about 250 to 300 grams of the coarse material.

D. Heat the trihydrate, without added water, in a closed steel container for about fifteen hours at 170° C. Conversion to the coarse form is then substantially complete.

Continuous or at least occasional stirring is desirable during the treatment as it accelerates the reactions.

Summarizing, the dehydration and the conversion to the fine state may be carried out in the same vessel when the dehydration has been effected by the use of water alone, by continuing the treatment after the addition of a suitable solvent. In any case the treatment for converting the material to the fine state may be wholly separate from what is termed the dehydration step or it may be carried out in the same vessel by suitably increasing the solvent power, or activity, of the liquor. In general, increase in solvent power may be accomplished in several ways and the step which comprises it is distinct from the dehydration step in the sense that it is conducted under different conditions, as for example by adding a solvent when none was used in the dehydrating step, or by the addition of more of the solvent used in the first step, or, as in some cases has been found preferable, by the use of a different solvent (for example an acid when an alkali was used for dehydration), or by increasing the activity of the liquor by an increase in temperature.

The trihydrate for treatment by my process need not be a refined material, such, for example, as produced by the Bayer process, since in some cases good results can be obtained with crude trihydrate as found in nature, as for example the mineral bauxite. It has also been found that the alumina "scale" deposited on the iron surfaces of the tanks containing the hot sodium aluminate liquor of the Bayer process can be converted into fine hydrate of low water content by a single treatment.

It is to be understood that the invention is not limited to the specific procedures herein described but can be carried out in other ways without departure from its spirit.

I claim—

1. Process of converting aluminum trihydrate into a hydrate having a content of combined water not exceeding that of aluminum dihydrate, comprising heating aluminum trihydrate in the presence of water and a solvent of aluminum trihydrate and at a temperature not less than about 120° C. until the desired conversion is effected.

2. Process of converting aluminum trihydrate into a hydrate having a content of combined water not exceeding that of aluminum dihydrate, comprising heating aluminum trihydrate for a suitable period in the presence of water and alkali hydroxid and at a temperature between about 120° C. and 200° C.

3. Process of converting aluminum trihydrate into a hydrate having a content of combined water not exceeding that of aluminum dihydrate, comprising heating aluminum trihydrate for a suitable period, in the presence of water and an active alkali solvent for aluminum trihydrate, at a temperature between about 120° C. and 200° C.

4. Process of converting aluminum trihydrate into a hydrate having a content of combined water not exceeding that of aluminum dihydrate, comprising heating aluminum trihydrate in the presence of water until the desired conversion to suitable particle size and water content not exceeding that of aluminum dihydrate has occurred, and then heating the converted hydrate in the presence of water and a solvent capable of dissolving a portion of such hydrate.

5. Process of producing aluminum hydrate having a content of combined water not exceeding that of aluminum dihydrate, comprising heating coarse aluminum hydrate of low water content in a solution of an alkali hydroxid which is an active solvent of aluminum hydrate in amount sufficient to dissolve only a portion of the hydrate.

6. Process of producing aluminum hydrate of fine particle size having a content of combined water not exceeding that of aluminum dihydrate, comprising heating coarse aluminum hydrate of low water content in an active solvent for aluminum hydrate in amount sufficient to dissolve only a portion thereof.

7. Process of producing finely divided aluminum hydrate of talc-like texture comprising heating aluminum trihydrate with an aqueous solution of sodium hydroxid at about 170° C. for a suitable period, and digesting the solid residue with a solution of greater activity as a solvent of said residue.

8. Process of producing finely divided aluminum hydrate of talc-like texture comprising heating aluminum trihydrate for a suitable period in the presence of water and an active solvent for aluminum trihydrate, and thereafter increasing the solvent power of the solvent and continuing the heating thereof.

9. As a new product, aluminum hydrate having a low content of combined water, consisting of minute particles and fine loosely-bound aggregates of such particles, having more or less the feel of finely divided talc and capable of smearing on a smooth vitreous surface.

10. Process of converting aluminum trihydrate into a hydrate having a content of combined water not exceeding that of aluminum dihydrate, comprising heating aluminum trihydrate for a suitable period in the presence of water and sodium carbonate at a temperature not less than about 120° C. until the desired conversion is effected.

11. Process of producing finely divided aluminum hydrate of talc-like texture comprising heating aluminum trihydrate with an aqueous solution of sodium carbonate at about 170° C. for a suitable period, and digesting the solid residue with a solution of greater activity as a solvent of said residue.

MARTIN TOSTERUD.